May 4, 1965  R. D. STODDARD  3,181,255
SNOW REMOVAL APPARATUS
Filed Aug. 13, 1962  2 Sheets-Sheet 2
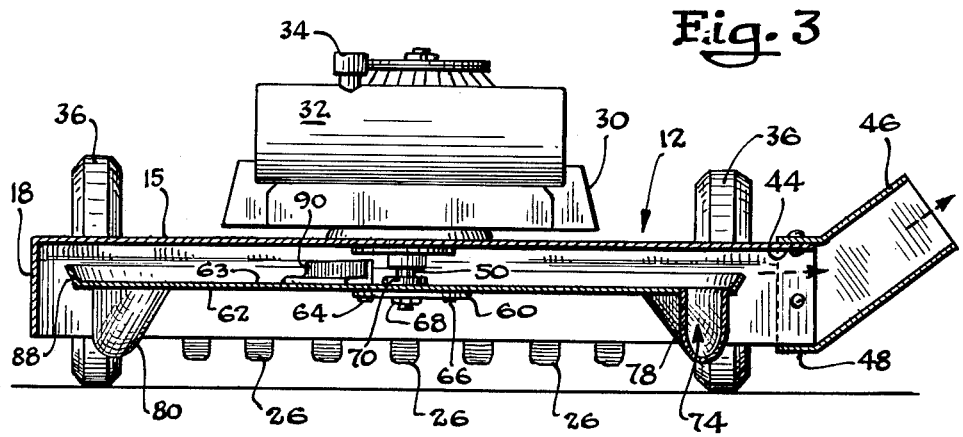
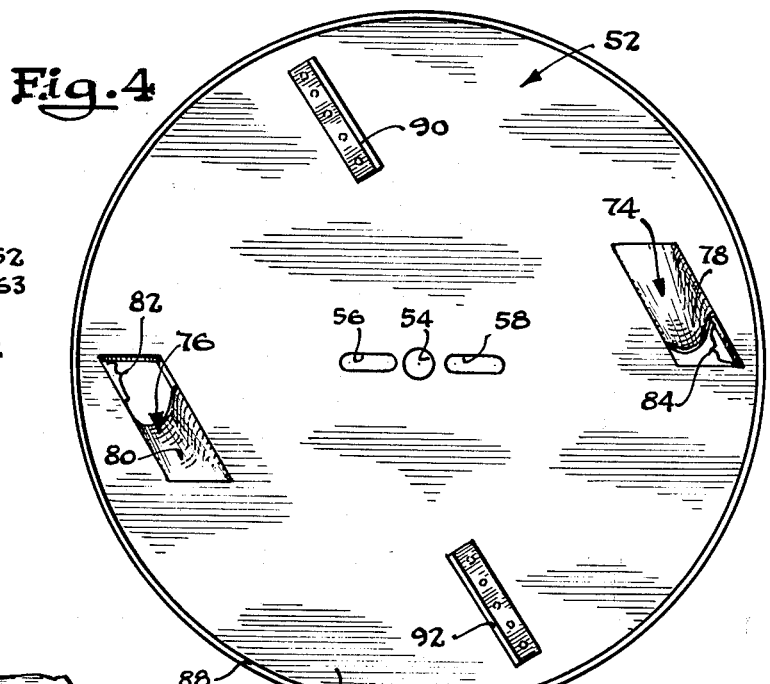
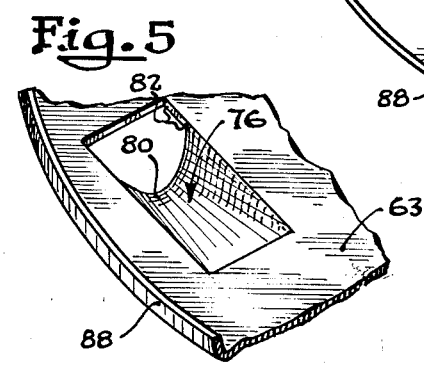
Inventor
Richard D. Stoddard
By George E. Frost & Keith J. Kulie
Attorneys 3,181,255
SNOW REMOVAL APPARATUS
Richard D. Stoddard, Rte. 1, Ord, Nebr.
Filed Aug. 13, 1962, Ser. No. 216,555
1 Claim. (Cl. 37—43)

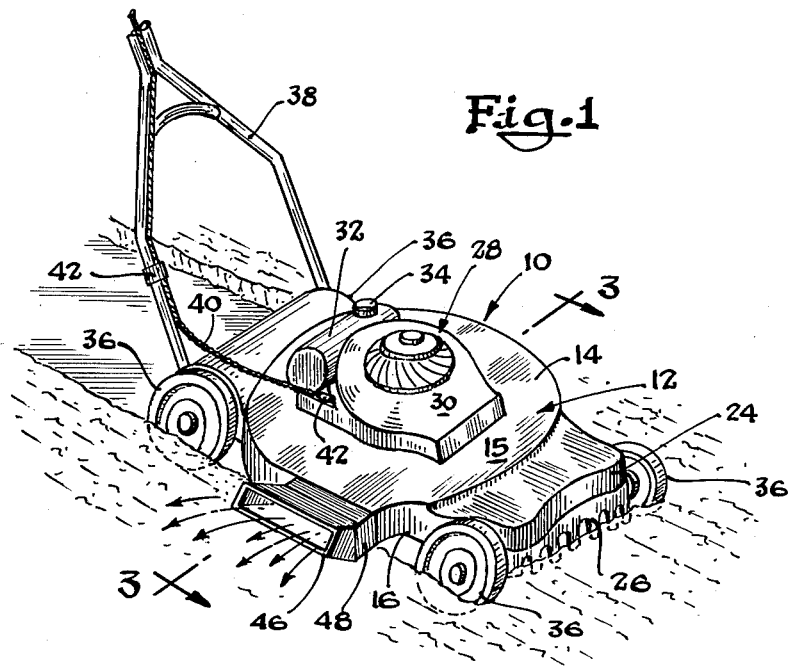
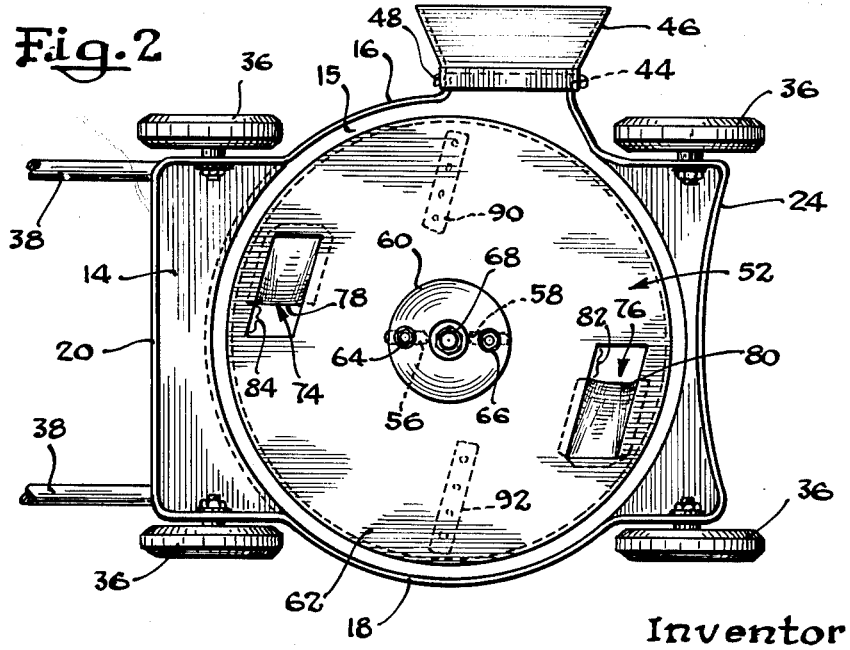

The present application relates to snow removal apparatus and more particularly it relates to snow removal apparatus of the rotary type adapted to be attached to a conventional powered rotary lawn mower.

Rotary powered lawn mowers are normally provided with a horizontal grass cutting blade affixed to the depending shaft of the power means, said blade being adapted for horizontal rotary motion within depending skirt portions of the mower housing. The blade normally is defined by inclined portions adjacent the outer periphery thereof which portions are sharpened at the leading edge to more effectively cut the grass. The inclined portion of the blade is adapted to sweep the grass upwardly within the housing and to create a positive pressure within the upper chamber of the housing. The grass trapped within the upwardly cycling column of air and grass created by the rotating blade is then thrust out the discharge chute positioned in one side of the housing and is either caught or spread upon the ground. Such a construction is not effective for removal of the extremely light snow particles in the same manner, however. The snow particles are only disturbed and thrust about with such an apparatus in uncontrolled fashion and there is little tendency for the snow to be discharged from the side discharge chute of the mower.

In accordance with the present invention an improved disc is provided which scoops up the snow within the path of the converted mower and sweeps it, in controlled fashion, to the upper portion of the housing and therefrom into and out of the discharge chute of the housing.

The disc attachment for the power mower is formed from a solid, substantially circular disc portion having downwardly inclined scoops located at radially spaced intervals about the otherwise solid disc. The scoops intercept and sweep the snow up along the scoop and onto the top face of the disc where it is urged outwardly of the housing by centrifugal action, eventually being discharged from the discharge spout in one of the depending skirt portions of the housing.

It, accordingly, is a general object of the present invention to provide an improved snow removal apparatus in the form of a conversion unit for the conventional powered rotary lawn mower.

An additional object of the present invention is to provide a disc like snow removal conversion element for a powered rotary lawn mower which is simple in construction, easy to install, and durable in use.

A further object of the present invention resides in the provision of an integrally formed disc conversion unit to convert the conventional rotary powered lawn mower into a snow removal apparatus, the disc having a plurality of depending scoops integrally defined therein and a plurality of fins adapted to provide positive discharge action for discharge of the snow from the housing of the mower.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 is a perspective view of the snow removal apparatus of the present invention, in use;

FIGURE 2 is a slightly enlarged bottom view of the snow removal apparatus of FIG. 1 illustrating the relationship of the disc and the mower housing;

FIGURE 3 is a view partly in cross-section taken along lines 3—3 of FIGURE 1 showing the disc member in operative relation in the depending skirt portion of the mower housing and illustrating the relationship of the discharge chute of the housing;

FIGURE 4 is a plan view of the disc of the present invention;

FIGURE 5 is a fragmentary view of one of the scoops and the area immediately adjacent thereto; and FIGURE 6 is a fragmentary view of one of the scoops of the disc member showing a resilient brush affixed to the lower edge thereof to facilitate removal of the snow.

Referring more particularly now to FIGURE 1, a conventional powered rotary lawn mower is indicated generally at 10. The mower 10 includes a housing, indicated generally at 12. The housing 12 has a top wall 14 and depending skirt portions 16, 18, 20 and 24, extending downwardly therefrom and integrally joined thereto. The housing preferably is formed from a single sheet of metal to define the construction shown and described. Attached to, and extending downwardly from, skirt portion 24 is a rake member 26 which is adapted to rake the grass prior to cutting thereof when the apparatus is employed as a mower. If it is convenient, the rake portion 26 may be removed when the mower is converted to snow removal use. The rake 26, however, does not effect operation of the mower as a snow removal apparatus except for the fact that it may be somewhat more difficult to push the mower through the snow in view of the fact that the rake encounters the snow prior to removal by the disc element (to be described below in detail).

Power means, indicated generally at 28, are mounted to the top wall 14 of the housing 12. The power means included herewith, for purposes of illustration only and not for purposes of limitation, is a conventional gasoline engine. The engine (not shown) is shrouded with a protective cover 30 for safety reasons. A gasoline reservoir 32 is attached to the housing 12 and is interconnected to the gasoline engine by a fluid line (not shown). The gasoline reservoir has a cap 34 in one area thereof to provide for access to the reservoir and to provide means for sealing the reservoir to prevent accidental spillage of any of the gasoline within the reservoir during use of the mower.

A plurality of wheels 36 are rotatably mounted with respect to the housing 12 of the mower 10 to effect means for moving the mower over the ground. A handle 38 is pivotally affixed to the housing 12 of the mower 10. A control cable 40 extends from the control element 42 on the gasoline engine, along the handle 38 and up to the terminal of the handle for convenience of the operator of the mower. The cable 40 is affixed to the handle 38 by a clamp 42.

The top wall 14 of the mower housing defines a slightly elevated portion 15 in one area thereof to provide the area within which the mower blade and snow removal disc may rotate. The depending skirt portions 16 and 18 define an arc along a segment of the length thereof, said arc portion defining, in cooperation with the top wall of the housing, the area within which the mower blade and snow removal disc rotate. The depending skirt portion 16 has an outwardly flaring spout portion 44 defined therein. A discharge chute 46 is adapted to be matingly received on the spout 44 and is clamped thereto by a belt clamp 48. As seen in FIGURE 2, the chute 46 flares outwardly toward the outer terminal thereof and is mounted is relation to the spout 44 such that it extends upwardly and away from the spout 44, as further seen in FIGURES 1 and 3.

As shown in FIGURE 3, a shaft 50 depends from the power means 28 of the mower and is operatively connected to said power means. The shaft 50 is adapted to rotate when said power means is operating and serves as a power take-off for the cutter blade of the lawn mower or for the snow removal disc as contemplated herein.

The disc of the present invention is illustrated in FIGURE 4 and is indicated generally at 52. An opening 54 is provided in the central portion of the disc 52 coaxial with the central axis of the disc. A pair of slotted openings 56 and 58 are provided in the disc at opposite sides of the central opening 54 thereof. As shown in FIGURES 2 and 3 herein, the disc 52 is affixed to the power take off shaft 50 of the power means by bolting thereto. A plate 60 having a plurality of openings therethrough which openings are coincidental with the openings 54, 56 and 58 of the disc 52, is fastened to the bottom face 62 of the disc 52. The plate 60 is fastened to the face 62 of the disc 52 by a plurality of bolts 64 and 66. A bolt 68 is threadably received within the free end of the shaft 50. The disc 52 is fastened to the shaft 50 by placing the disc 52 against the retaining collar 70—which collar is non-rotatably affixed to the shaft 50—and then passing the bolt 68 through the opening 54 of the disc and threading the bolt into the threaded opening in the end of the shaft 50. The central opening 54 and side slots 56 and 58 are also adaptable to a plurality of different fastening arrangements on various types of mowers.

The disc 52 is provided with a plurality of openings 74 and 76 extending therethrough at radially spaced positions thereabout. Each of the openings 74 and 76 are defined by scoop-like portions 78 and 80, respectively. The scoops 78 and 80 are formed integrally with the disc 52 by stamping out the portions identified at 82 and 84 to provide openings through said disc 52. The remaining portion of metal within the area defining the scoop portions 78 and 80 is then formed in a downwardly inclined, rounded scoop-like shape as shown in FIGURE 3. The forming may be formed by a conventional forming process and with a suitable cold drawing metal having relatively high flow characteristics.

As shown in FIGURE 6, a resilient sweeping member or brush 77 may be affixed to the lower edge of the snoop portions 78, for example, to facilitate efficient removal of the snow with the snow removal apparatus of the present invention. It can readily be seen that the brush may be provided of sufficient length to substantially reach the ground over which the snow removal apparatus is being moved and to engage the snow thereupon to sweep it up into the scoops and to thereby effect removal of said snow. It should be observed that it would be impractical to provide a disc construction wherein the scoops were formed to come as close to the ground as the brushes in that the rigid scoop would be damaged if the scoop should strike a hard or large object protruding slightly upwardly from the general surface of the ground. The brushes, on the other hand, upon striking such an object would merely deflect and pass thereover without damage either to the scoop, the disc, or the power means.

The manufacture of the disc 52 from a unitary piece of metal provides assured balance and stability of the disc. In view of the fact that the power means rotates the disc element at a relatively high r.p.m. the centrifugal forces acting upon the disc element 52 are high, said forces being accentuated by the inherent weight of the disc element.

The stamped out portions 82 and 84 of the scoop openings 76 and 74, respectively, of the disc 52 provide adequate area for inspiration of additional air during operation of the snow removal apparatus. In view of the fact that the disc 52 is solid other than for the scoop openings 74 and 76 air leakage about the disc 52 within the housing defined by the depending skirt portions is substantially eliminated. In this manner discharge of the snow particles from the area between the top face 63 of the disc 52 and the underside of the housing portion 15 accurs through the chute 46.

The periphery of the top face 63 of the disc 52 is defined by an upturned flange 88 which flares slightly outwardly. The upwardly outwardly flaring flange 88 further facilitates discharge of the snow circulating above the disc 52.

A plurality of upstanding fins 90 and 92 are rigidly affixed to the upper face 63 of the disc 52 at radially spaced intervals thereabout. The fins may be affixed by welding them to the disc or by fastening them thereto by metal screws or bolts, or the like. The fins also may be integrally formed from the base portion of the disc 52 by stamping the proper configuration in the flat base portion and then folding the stamped portion upwardly to define the fins.

In operation, the power means 28 is started to effect rotation of the shaft 50. The shaft 50 and the disc 52 are relatively non-rotatably interconnected, as noted hereinabove so that when the shaft 50 rotates the disc 52 is urged in the same angular direction as that defined by the rotating shaft. As the snow removal apparatus 10 is moved along to engage the snow the rotating scoops 74 and 76 pick up the snow in the path of the snow removal apparatus 10. The snow is directed up along the path defined by the downwardly inclined portions 78 and 80 defining the scoops noted above and is deposited on the upper face 63 of the disc 52. The snow in the upper housing chamber defined between the top face 63 of the disc 52 and the under side of the housing 15 is directed in a circular path under the action of the rotating disc and is assisted in such path by the urging of the upstanding fins 90 and 92. A centrifugal action is imparted to the snow and air admixture in the upper housing chamber as hereinabove defined, said centrifugal action tending to urge the snow and air outwardly against the depending skirt portions of the housing. It can readily be seen that the centrifugal action imparted to the snow-air mixmixture and the urging of said mixture outwardly toward the skirt portions will tend to pass the snow along to the only escape route provided in the skirt portions, namely, the discharge spout 46. The snow is thereby moved outwardly and discharged through the spout without the necessity for a supplemental fan or like apparatus to urge the snow out said spout.

It should be noted that the scoops 74 and 76 are rounded in the embodiment illustrated herein. The rounded scoop members reduce the air turbulence that would otherwise occur with rectangularly shaped scoops, which turbulence would tend to defeat the control of the snow removal and would blow the snow about and away from the scoops. Such scoop construction would thus tend to be less effective than the rounded scoop construction shown herein. The cut-away portions 82 and 84 of the scoops are provided so that additional air may be scooped up with the removal of the snow and passed along the scoops to the upper face of the disc. The excess air thus trapped in the upper housing chamber hereinabove defined facilitates discharge of the air through the discharge spout by creating a high pressure area and a greater mass of material. The centrifugal action upon the particles within the chamber is assisted by the increased mass and thus there is a greater tendency to urge the snow and air admixture outwardly through the discharge spout.

It should be observed that brushes or other resilient sweeping devices may be affixed to the lower edge of the scoops to facilitate sweeping of the snow into the scoops and thereby effect more efficient removal of the snow. Such brushes, however, are not essential to operation of the snow removal apparatus of the present invention.

While I have shown and described a specific embodiment of the present invention it will, of course, be understood that other modifications and alternative constructions may be used without departing from the true spirit and scope of the invention. I therefore intend by the appended claim to cover all such modifications and alternative constructions as fall within their true spirit and scope.

What I claim as new and desire to secure by Letters Patent of the United States, is:

A snow removal apparatus having a wheeled housing open at its bottom and having a top wall and depending skirt portions thereabout, and a discharge chute extending outwardly from one of the depending skirt portions of the housing in free communication with the area defined within the housing, said apparatus further characterized by power means mounted on said housing and having a power shaft extending into the area defined within the housing, said apparatus comprising:

a disc affixed to the shaft of the power means and disposed within the housing for rotative movement therein in accord with the movement of the shaft, said disc being defined by a flat circular base portion having a top and bottom surface, a pair of scoop openings extending fully through the base portion, said base portion having scoops integral therewith and extending from the bottom surface of the base along the scoop openings, said scoops being substantially smaller in total area than the scoop openings of the base portion thereby to provide means for unrestricted admission of air through said openings during operation of the apparatus to prevent pressure buildup in the openings that would inhibit the introduction of snow into said openings, said base portion further having radially oriented upstanding fins affixed to the top surface thereof, said fins adapted to present an upstanding barrier serving to impart rotative cyclonic motion to the air-snow mixture above the disc during operation of the apparatus, the periphery of the base portion terminating in an upwardly flaring wall portion to urge the air-snow mixture upwardly through the chute upon discharge from the apparatus.

References Cited by the Examiner
UNITED STATES PATENTS

| 2,983,057 | 5/61 | Erickson. | |
| 2,984,462 | 5/61 | O'Connor | 259—134 X |
| 2,984,919 | 5/61 | Stoddard | 15—79 X |
| 3,035,359 | 5/62 | Ewert | 37—431 |
| 3,061,480 | 10/62 | Zink et al. | 134—6 |

FOREIGN PATENTS 95,598   2/60   Norway.

CHARLES A. WILLMUTH, *Primary Examiner.*